United States Patent [19]

Walsh

[11] 4,021,903

[45] May 10, 1977

[54] METHOD AND TOOL FOR REMOVING LOCK CYLINDER ASSEMBLIES

[76] Inventor: Richard Walsh, 1443 W. Norwood St., Chicago, Ill. 60660

[22] Filed: Nov. 6, 1975

[21] Appl. No.: 629,590

[52] U.S. Cl. .................................... 29/261; 29/263
[51] Int. Cl.² .................................... B23P 19/04
[58] Field of Search ............................ 29/259–263, 29/265

[56] References Cited

UNITED STATES PATENTS

| 2,050,005 | 8/1936 | Heegeman | 29/263 |
| 2,614,318 | 10/1952 | McCord | 29/263 |
| 3,133,342 | 5/1964 | Ridings | 29/263 |
| 3,401,445 | 9/1968 | Fritch | 29/261 |

FOREIGN PATENTS OR APPLICATIONS

| 1,078,959 | 4/1960 | Germany | 29/259 |
| 1,269,069 | 5/1968 | Germany | 29/261 |

*Primary Examiner*—James L. Jones, Jr.
*Attorney, Agent, or Firm*—Edmond T. Patnaude

[57] ABSTRACT

A lock cylinder assembly is removed from a steering column by means of a tool incorporating a collet member having a plurality of spring fingers which grip the end of the lock cylinder and a body member having a cylindrical flange which fits between the end of the collet and the supporting structure surrounding the lock to hold the fingers in engagement with the lock cylinder as a bolt is tightened to pull the collet into the body.

5 Claims, 5 Drawing Figures

U.S. Patent  May 10, 1977  4,021,903

METHOD AND TOOL FOR REMOVING LOCK CYLINDER ASSEMBLIES

The present invention relates in general to the art of pulling one member out of another member in which it is held, and it relates more particularly to a new and improved method and tool for removing a key lock cylinder assembly from the supporting structure in which it is mounted.

BACKGROUND OF THE INVENTION

Combination ignition and steering wheel locks as now used on most automotive vehicles include a key operated cylinder assembly which fits into an opening in the steering column and is locked in place by means located within the steering column. In some vehicles replacement of such cylinder assemblies requires the removal of the steering wheel, a time consuming and expensive operation. Since the lock cylinder assembly itself is a relatively inexpensive part any damage which occurs thereto during removal is of little consequence. On the other hand, attempts to physically break the lock assembly free from the steering column have in the past generally resulted in damage to the steering column itself.

OBJECTS OF THE INVENTION

An object of the present invention is, therefore, to provide a new and improved method and tool for removing lock cylinder assemblies from the supporting structures in which they are fastened.

Another object of the present invention is to provide a new and improved tool which is quickly attachable to a lock cylinder assembly and which can be used to pull the assembly from the support structure in which it is mounted.

SUMMARY OF THE INVENTION

There is provided in accordance with the present invention a new and improved method and tool for removing a lock cylinder assembly from a supporting structure such as a steering column in which it is secured by means of tabs or the like on the lock cylinder itself. The tool includes a generally cylindrical collet having a plurality of resilient fingers which grip the end of the lock cylinder when the collet is pressed thereon. After the collet has been placed on the lock cylinder a body cylinder is placed over the collet with a thin, co-axial, cylindrical flange on the body member extending between the collet fingers and the surrounding surface of the support. A bolt is then inserted through an axial opening in the outer end of the body member into a threaded hole in the end of the collet, and as the bolt is tightened, the collet is drawn into the body which prevents the resilient fingers from expanding out of engagement with the lock cylinder. As the collet is moved into the body member and thus exerts an outward force on the lock cylinder the locking tabs on the lock cylinder assembly are broken off and the cylinder assembly is withdrawn from the steering column. After removal of the lock cylinder assembly a new cylinder assembly may be simply pressed in place in the steering column. In replacing the lock cylinder in this manner, no damage is done to the steering column or to the parts therof which are operated by the lock cylinder mechanism.

BRIEF DESCRITPION OF THE DRAWING

Further objects and advantages and a better understanding of the present invention can be had by reference to the following detailed description, wherein.

DETAILED DESCRIPTION OF THE INVENTION

Figure 1:
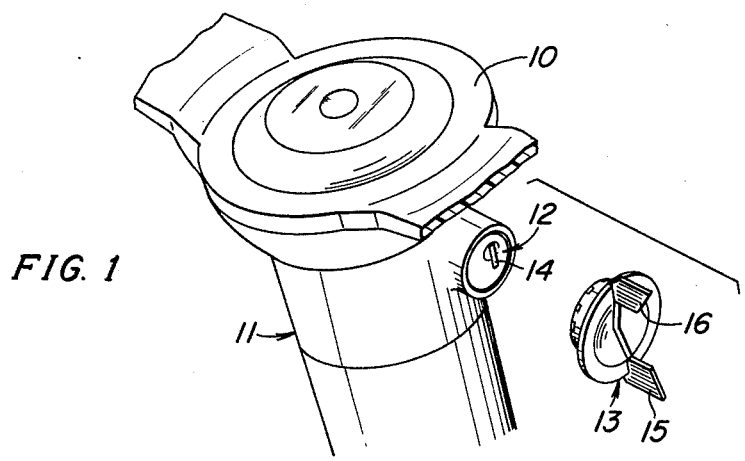
FIG. 1 is a fragmentary perspective view of a combination ignition and steering wheel lock with the finger ring removed.

Referring now to FIG. 1, there is shown a portion of a steering wheel 10 and a steering column 11 to which it is mounted. A combination ignition and steering wheel lock cylinder assembly 12 is mounted in the steering column and connected internally of the steering column to a mechanism for locking the steering wheel 10 against rotation when the lock assembly 12 is in locking position. A finger ring 13 is positioned over the lock cylinder assembly and snapped onto an annular flange 17 at the outer end of the lock assembly to facilitate placement of a key in the key slot 14 in the cylinder assembly. The ring 13 includes a pair of finger engaging lugs 15 and 16 to facilitate turning of the key after it has been placed in the slot.

Figure 2:
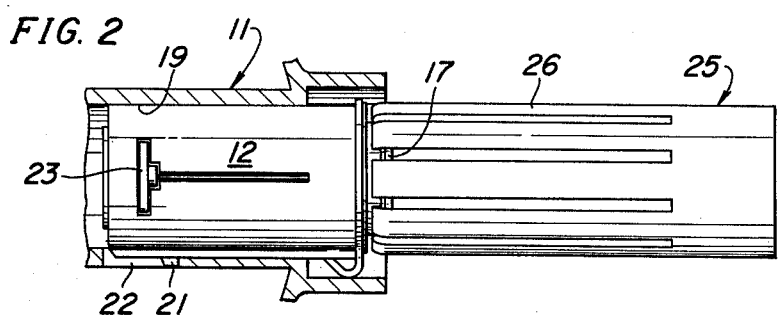
FIG. 2 is an elevational view of a lock cylinder with the collect portion of the tool of the present invention attached thereto, the surrounding structure being shown in cross-section.
Figure 3:
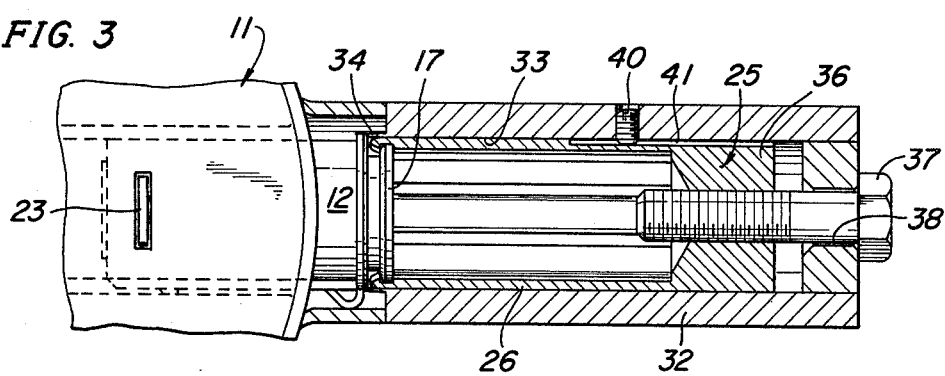
FIG. 3 is a cross-sectional view of the tool of the present invention in position to remove a lock cylinder.

Referring to FIG. 2, a portion of the steering column 11 is shown in cross-section and includes a cylindrical recess 19 in which the lock cylinder assembly 12 fits. In order to lock the cylinder assembly 12 within the steering column the cylinder assembly 12 includes an outwardly biased spring loaded tab 21 which extends into a lateral slot 22 in the steering column and a spring loaded tab 23 which engages an inwardly facing shoulder on the steering column 11. In some vehicles such as those manufactured in recent years by the General Motors Corporation the tabs 21 and 23 can only be released by first removing the steering wheel from the steering column and then releasing the tabs from within the steering column.

Figure 4:
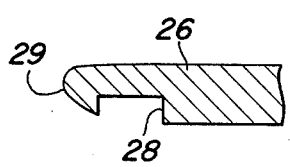
FIG. 4 is an enlarged cross-sectional view of the end of one of the fingers of the collet.

In order to remove the lock cylinder assembly 12 from the steering column in accordance with the method of the present invention, the finger ring 13 is first removed by means of a suitable prying tool such as a screw driver. A collet member 25 having a plurality of spring fingers 26 arranged in a cylinder is then pressed onto the end of the lock cylinder 12 such that gripping means at the end portions of the fingers overlie an annular flange 27 at the outer or distal end of the lock cylinder assembly. The ends of the fingers fit within the annular space surrounding the lock cylinder. As best shown in FIG. 4, each finger 26 includes and internal rectangular groove 28 near the end which fits over the annular flange 27 at the end of the lock cylinder assembly 12. The forward end or nose of each finger 26 is rounded as shown at 29 to provide a camming surface which causes the fingers to spring out as the collet is pressed against the end of the lock cylinder. The fingers 26 then contract as the slots 28 align themselves with the flange 27. In practice, it is found that the collet may be easily and quickly snapped onto the flange 17 by simultaneously pushing and turning the collet.

After the collet 25 has been placed on the lock cylinder as shown in FIG. 2 and the fingers 26 are in their normally unstressed position as there shown, a sleeve-like body member 32 having a cylindrical internal recess 33 is placed over the collet 25. At the front end the body member 32 has a thin coaxial flange 34 which is adapted to extend over the end portions of the fingers 26 when the collet is attached to the lock cylinder assembly. The outer end portion 36 of the collet 25 is threaded to receive a bolt 37 which extends through a hole 38 in the outer end portion of the body member 32. As shown, the body member 38 may be formed by a tubular sleeve portion and a solid end plug suitably welded together. After the body member 32 has been placed over the collet the bolt 37 is inserted through the opening 38 into the aligned threaded opening in the end portion 36 of the collet 25 and the bolt 37 is rotated to draw the collet 25 into the body member 32. In order to prevent the collet 25 from rotating at this time, a set screw 40 extends through the body member 32 into a longitudinal slot 41 in the outer surface of the collet 25. As the nut is tightened and the collet 25 is pulled into the body member 32 the fingers 26 are initially prevented from expanding by means of the flange 34 on the body member 32. As the collet is pulled into the body member and an outward axial force is exerted on the lock cylinder assembly, the body portion of the cylinder assembly inwardly of the tabs 21 and 23 ordinarily breaks off and falls down into the steering column. The lock cylinder is then free to be removed.

Figure 5:
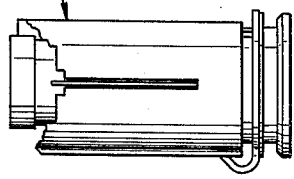
FIG. 5 is a view of a lock cylinder after removal thereof from a steering column by the method and tool of the present invention.

After the lock cylinder has been removed it will generally have the appearance shown in FIG. 5 wit portions of the inner end broken away. A new lock cylinder assembly may now be installed by simply inserting the new one in place in the recess 19 in the steering column. The entire operation can be done very quickly and no permanent damage is done to the steering column or to the mechanism contained therein.

While the present invention has been described in connection with a particular embodiment thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. A tool for removing a lock assembly from an opening in a support in which it is mounted, comprising
    a tubular body member having a cylindrical bore and an annular open end adapted to be butted against said support in coaxial relationship with said lock assembly,
    collet means having a plurality of resilient fingers having gripping means at the ends thereof for gripping the outer end of said lock assembly,
    said collet means being slidably received in said body member for movement from a position wherein said fingers extend outwardly through said opening and a position entirely within said body member.,
    screw means for drawing said collet means into said body member to retract said lock cylinder from said support when said gripping means are in gripping engagement therewith, and
    a thin annular flange having an internal cylindrical surface coextensive with said cylindrical bore and extending outwardly from said annular open end of said body member for insertion into said opening in said support around the ends of said fingers to hold said gripping means against said lock cylinder while said gripping means are within said support.

2. A tool according to claim 16 wherein said gripping means comprise
    internal grooves in said fingers.

3. A tool according to claim 2 wherein said ends of said fingers respectively include
    a camming surface for expanding said fingers as said collet is pressed against the outer end of said lock assembly.

4. A tool according to claim 1 wherein
    said fingers are arranged in a cylinder.

5. A tool according to claim 1 wherein
    said collet has a closed inner end provided with an internally threaded axial opening therethrough,
    said body member has a closed end provided with an axial opening therethrough, and
    said screw means includes a screw extending through said axial opening in said body member and threadedly engaging said threaded axial opening in said collet.

* * * * *

UNITED STATES PATENT AND TRADEMARK OFFICE
CERTIFICATE OF CORRECTION

PATENT NO. : 4,021,903
DATED : May 10, 1977
INVENTOR(S) : Richard Walsh

It is certified that error appears in the above–identified patent and that said Letters Patent are hereby corrected as shown below:

Claim 2, line 1, "16" should be -1-.

Signed and Sealed this second Day of August 1977

[SEAL]

Attest:

RUTH C. MASON
*Attesting Officer*

C. MARSHALL DANN
*Commissioner of Patents and Trademarks*